Feb. 7, 1967  R. R. GOMEZ ET AL  3,302,828
SYSTEM FOR AUTOMATICALLY DISPENSING PREDETERMINED
QUANTITIES OF SELECTED ARTICLES
Filed May 15, 1964  5 Sheets-Sheet 1

INVENTOR.
R. R. GOMEZ
M. PRICE
BY
ATTY.

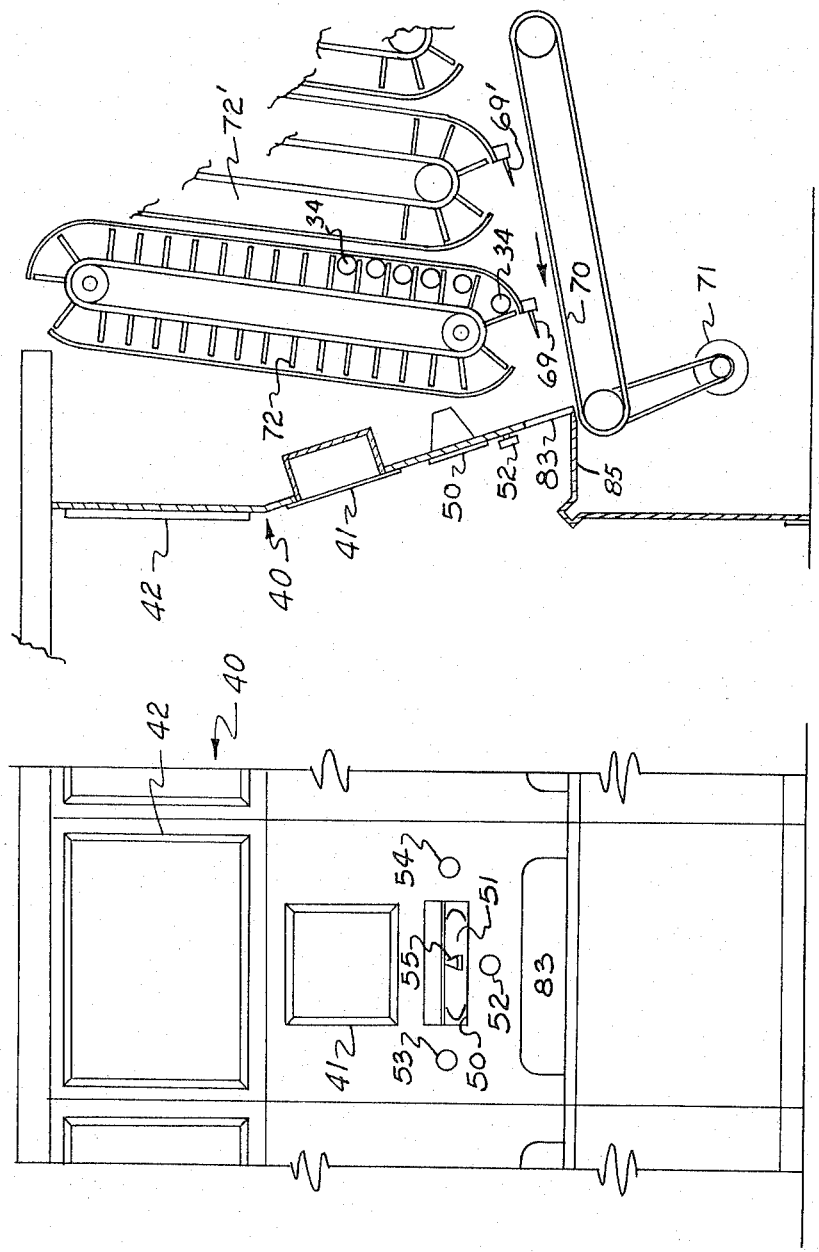

Feb. 7, 1967 R. R. GOMEZ ET AL 3,302,828
SYSTEM FOR AUTOMATICALLY DISPENSING PREDETERMINED
QUANTITIES OF SELECTED ARTICLES
Filed May 15, 1964 5 Sheets-Sheet 3

INVENTOR.
R. R. GOMEZ
M. PRICE
BY
ATT'Y.

INVENTOR.
R. R. GOMEZ
M. PRICE 3,302,828
SYSTEM FOR AUTOMATICALLY DISPENSING PREDETERMINED QUANTITIES OF SELECTED ARTICLES
Richard R. Gomez, Chadds Ford, Pa. (1304 Andover Road, Philadelphia, Pa. 19151), and Merton Price, Lower Merion, Pa. (% Frenchtown Porcelain Co., Frenchtown, Pa. 16836)
Filed May 15, 1964, Ser. No. 367,834
4 Claims. (Cl. 221—2)

This invention relates to a system for automatically dispensing predetermined quantities of selected articles from storage to a predetermined location upon purchase by a customer.

The various forms of automated merchandising which have been suggested have presented numerous shortcomings. Some of these systems have proposed highly complex machines activated by tapes, tags, or cards. Some of these conventional devices use a prepunched card system utilizing information provided by the card and limited thereby. Other systems have resorted to strips of paper as the means for activating the machine, but these systems are cumbersome, the strips are difficult and delicate to handle and therefore generally require special equipment.

A principal object of the present invention is to provide an automated system for selecting and delivering articles from convenient storage areas to a customer at a predetermined location.

An object of the invention is to provide an apparatus which upon activation by a customer delivers selected articles to the customer.

Another object of the invention is to provide means for the recording of information related to the article delivered, said information being in such form as to be transmittable to other automated equipment for further use thereof.

Another object of the invention is to provide rotatable means, such as a disc, for activating delivery of selected articles and for providing a record of meaningful information, the disc being adapted to being used a plurality of times for delivery of a plurality of selected articles.

Other objects of this invention, together with means and methods for attaining the various objects, will be apparent from the following description and the accompanying diagrams.

FIG. 3 is a front elevation of an article-selection station useful according to the present invention;

FIG. 4 is a partially schematic side elevation of the article-selection station and a combined storage and conveyor system for storing and delivery of articles upon command of the customer;

Figure 1:
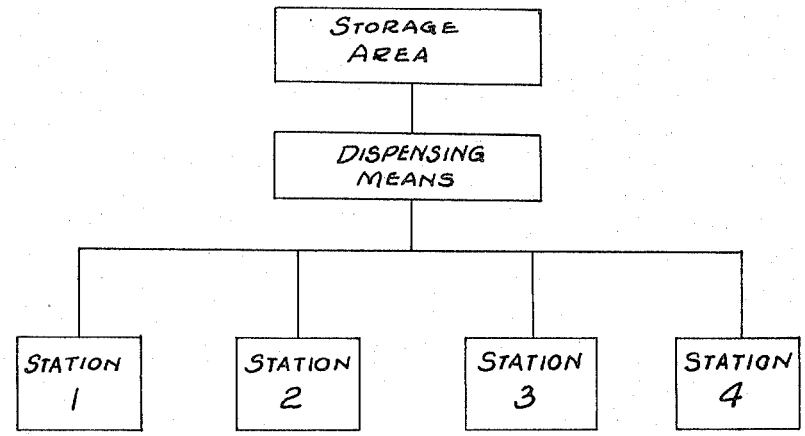
FIG. 1 is a block diagram of the arrangement of the automated system provided by this invention including multiple stations connected to the dispensing means.

The invention provides one or more, usually many, article selection stations with which threre are associated means for selecting articles and means for recording information relating to the articles selected. Each station is associated with at least one particular sort or type of article and carries, or has connected therewith, manually operable article-selection means effective to operate dispensing means to release the article. Each station may also be associated with a multiplicity of types of articles having connected therewith more than one article-selection means.

A particular feature of the invention relates to portable means, such as a polygonal, but preferably, circular, card, which serves to select a predetermined article and to store information which can be automatically processed for inventory control, for price totalizing, etc., by any desired means, such as conventional computing equipment. The portable means which is hereinafter referred to as the selecting card, is designed to be adapted to be inserted into a slot in the article delivery mechanism to render said mechanism operative. The card may be used to activate a plurality of article-selection and delivery stations in any desired sequence. The information relevant to the articles selected may be recorded on said card in the form of slots, holes, markings, printing or any other type of indicia.

The selecting card is so designed that any portion thereof which was used once loses its capacity to render the article-selection and delivery means operative. In other words, a portion of the selecting card which was once used and has received the above mentioned indicia as a result of having rendered the article selecting and delivery mechanism operative, will not again operate the selection and delivery mechanism. The selecting card is adapted to be moved with respect to the article-selection and delivery means, so as to present a fresh, or unused portion, which will be effective to render the article-selection and delivery means operative again until all of the portions of the selecting card have been used up. The number of portions effective to render the article selection and delivery means operable will vary with the size of the portions and the size of the card. In this particular embodiment of the invention the intact peripheral edge of the selecting card is the portion effective to actuate the article-selection and delivery mechanism, and any notches cut in said edge render the portions so notched ineffective to operate the article-selection and delivery mechanism.

The invention further provides sensing means, one at each station, which are adapted to render the article-selection and delivery means inoperative in the absence of a portion of said selector card which is effective to render the article-selection and delivery means operative. The sensing means is adapted to preclude further selection and delivery of articles until the selector card has been moved to present a portion thereof which is effective to render the article-selection means operative again. In operation, therefore, the portion of the selecting card which is effective to render the article-selection and delivery means operative becomes ineffective after having operated the selection means and must be replaced by a portion of the selecting card which is effective to operate the selection means again.

In accordance with the invention, the article-selection and delivery mechanism operates means for dispensing the selected articles and for conveying them to a desired location where they are made available to the customer. These means are installed in a manner best suited to the overall plan of the store. Each article-selection means is associated with and is adapted to operate its companion article-dispensing means. In one embodiment, one or more conveyors carrying the articles are so located that, upon operation of the article-selection means, the article selected is moved away from the other articles and drops onto a conveyor belt which carries it to a delivery area. In another embodiment an escapement mechanism can be used to deliver the selected articles.

In accordance with the invention, means are also provided for recording, on the selector card, indicia relevant to the selected article. Such means can cooperate with the means that render the portions of the card ineffective to render the article-selection means operative so that both operate simultaneously. The recording means can impart any type of desired information with respect to the selected article such as price, type of article, number of items and the like. The information may be provided by means of holes, slits, printing, and other detectable means. In one embodiment of marking head carries printing pins and punches which simultaneously prints, information such as price, and cuts out apertures in the selector card. Information imparted onto the selector card corresponds to each purchase of an article and where a circular or polygonal card is used, the information applied to peripheral radial portions; if and when the periphery of the card has been fully used each radial portion will carry printing and an aperture, such as a notch in the peripheral edge.

FIG. 1 shows schematically the interrelationship of a plurality of article-selection stations (denoted as Station 1, Station 2, Station 3 and Station 4) each of which is connected to article dispensing means and adapted to effect selection and delivery of articles thereby from the illustrated dispensing area.

Figure 2:
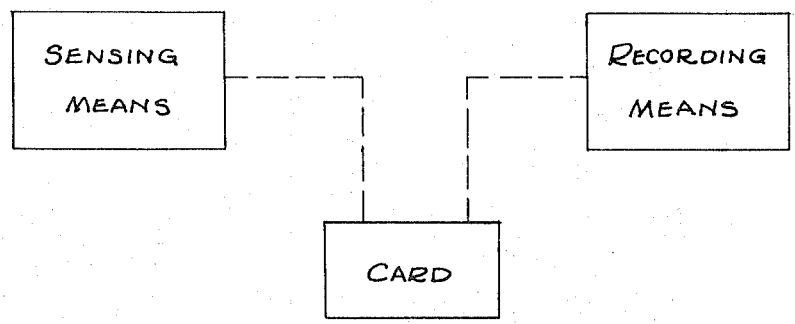
FIG. 2 is a block diagram of components of an article-selection station of FIG. 1.

FIG. 2 indicates components of an article-selection station, in which sensing means and recording means interact physically (indicated by interconnecting dashed lines) upon a card (also indicated simply in block form). Details of these and related features are illustrated in additional views and are described below.

Figures 5, 6, 9:
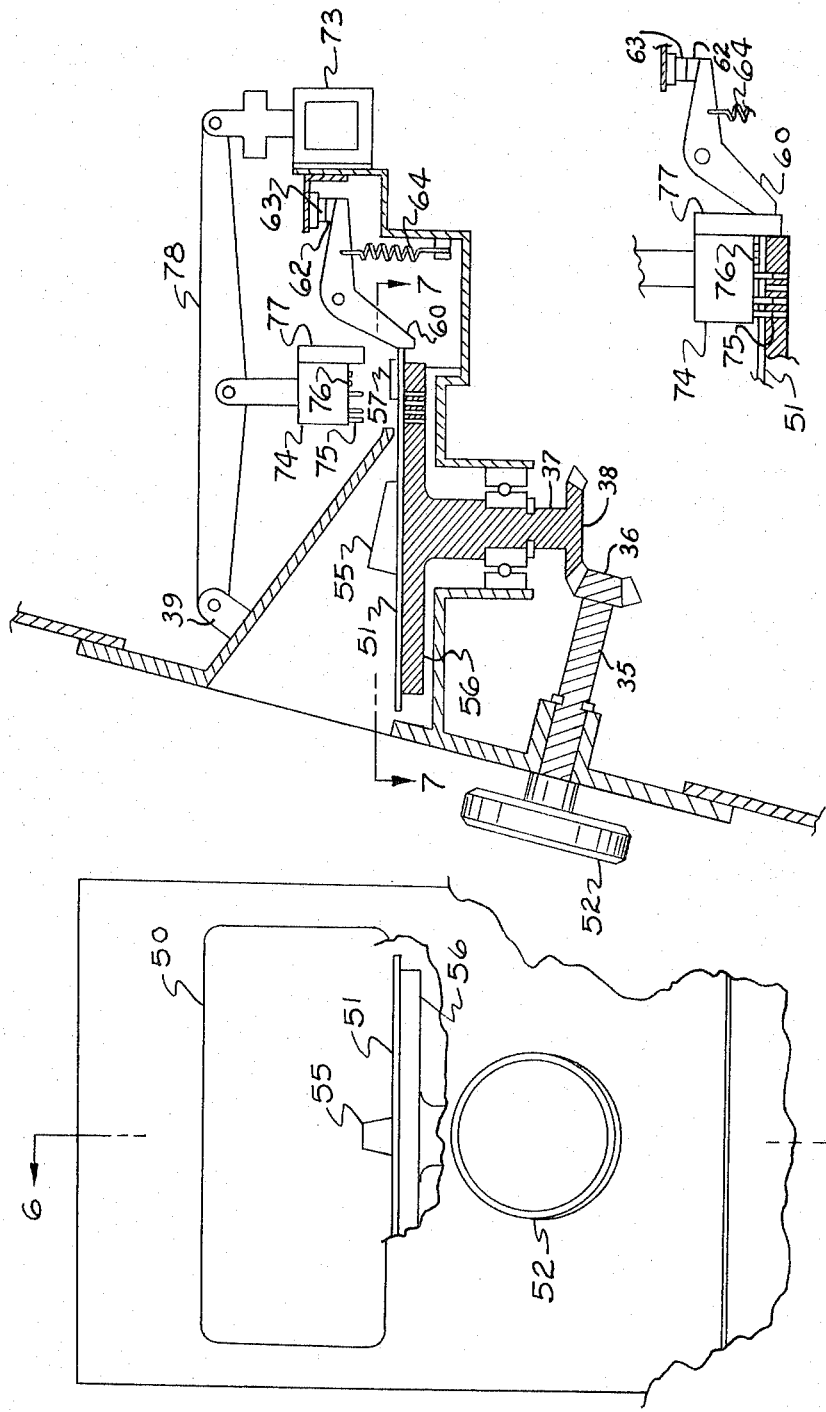
FIG. 5 is a front elevation on an enlarged scale and partly in section of part of the apparatus of FIG. 3.
FIG. 6 is a side sectional elevation of the article-selection station, on an enlarged scale, taken at 6—6 on FIG. 5.
FIG. 9 is a side sectional view of the apparatus of FIG. 8 (in an alternative position) and of indicia-recording means.

FIG. 3 shows an article-selection station 40 which includes a vertical partition provided on its inner side with shelves for storing articles for display through window 41 with or without advertising matter 42. Also facing the customer is a horizontal slot 50 into which the selector card 51 is inserted onto a spindle 55 located in the center of turntable 56 which is best shown in FIGS. 5 and 6, and which is turned by knob 52 properly to position the selector card to actuate the electrical circuits for selective delivery of the products as described below. Lamp 53 beside slot 50 is a convenient signal device for showing that the card is properly positioned and that the delivery system is ready to be actuated. Article-selection switch button 54 which is located on the other side of slot 50 is depressible to effect dispensing and delivery of the selected article. As shown in FIG. 4, this may be accomplished by causing conveyor 72 to advance by an increment of position or location and to deliver one article onto conveyor belt 70 and through opening 83 in the front of the cabinet.

FIG. 4 shows a belt conveyor 72 with radial slots supported on upper and lower rollers and a housing with openings for loading and discharging the articles one by one at the upper and lower ends, respectively. One or more additional such conveyors (72', etc.) can be provided to carry one or more other sorts of articles. When a conveyor advances by one increment it releases one article 34, which then falls onto delivery conveyor belt 70 driven by motor 71. The delivery conveyor belt brings the article towards the customer to opening 83 in the front of the display cabinet through which the article can be removed. As the article falls from the storage conveyor it actuates switch 69 which is shown at the lowermost portion of the storage conveyor (and further in FIG. 10).

Figure 7:
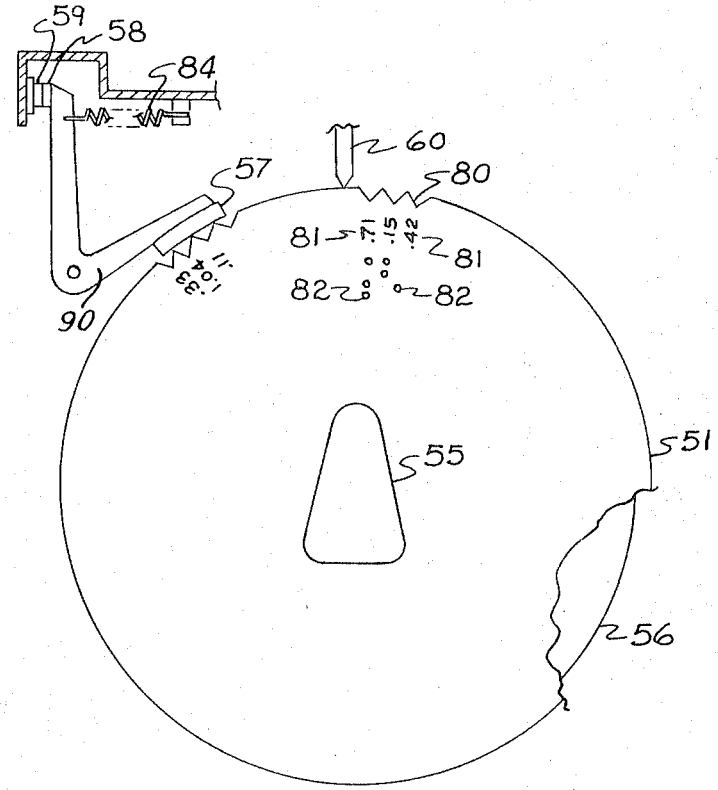
FIG. 7 is a sectional plan through the article-selection station taken at 7—7 of FIG. 6.
Figure 8:
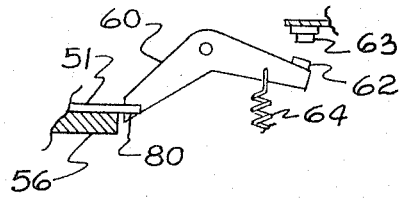
FIG. 8 is a detailed side sectional elevation of a portion of the sensing means shown in part on FIG. 7, certain parts being omitted.

FIGS. 5 and 6 show in more detail the relationship between knob 52 and turntable 56 and spindle 55, which receives card 51. As can be seen from these views, knob 52 is carried by a shaft 35 which carries a gear 36 at its other end. Turntable 56 has a pendent stem 37 which carries a gear 38 which meshes with gear 36 so that turning knob 52 turns the turntable 56 and card 51 carried thereby. The presence of the card 51 on the turntable is detected by a sensor 57, which is shown in FIGS. 6 and 7 and which is carried by a pivoted arm 90 which moves against the force of spring 84. FIG. 6 further shows pivoted sensing means 60 having one of its arms either in contact with the unused periphery of card 51, as shown in FIG. 7, or lying in a notched portion thereof, as shown in FIG. 8. The other arm of the sensing means carries contact 62 which closes against contact 63 against the bias of spring 64 when the sensor is in contact with the unused periphery of card 51.

FIG. 6 also shows the punching and coding head 74 which is actuated by the solenoid 73. The head is centrally connected to a transverse arm 78 which has one end pivotally connected to the solenoid and its other end pivotally connected to a fixed support 39. The coding head carries a cutting or notching element 77 to cut notches 80 into the periphery of the card. The coding head also carries on its bottom face pins 75 to puncture the card and type 76 to print information on the card as shown in FIG. 9.

FIG. 7 shows the price of the article printed, at 81, on the top of the disc as well as product identifying indicia or other coded data 82.

The cooperation of the sensing element 60 with the periphery of the card, the contacts 62 and 63 of the electrical circuit, and punching head 74 are more fully shown in FIGS. 8 and 9 from which it will be seen that pins 75 perforate card 51 while information is being printed on it. In FIG. 9 the notching element 77 is shown in the act of punching a notch in the edge of card 51 and FIG. 8 shows the extremity of the sensing element positioned in the notch of the card after the notching element has moved upwardly.

Figure 10:
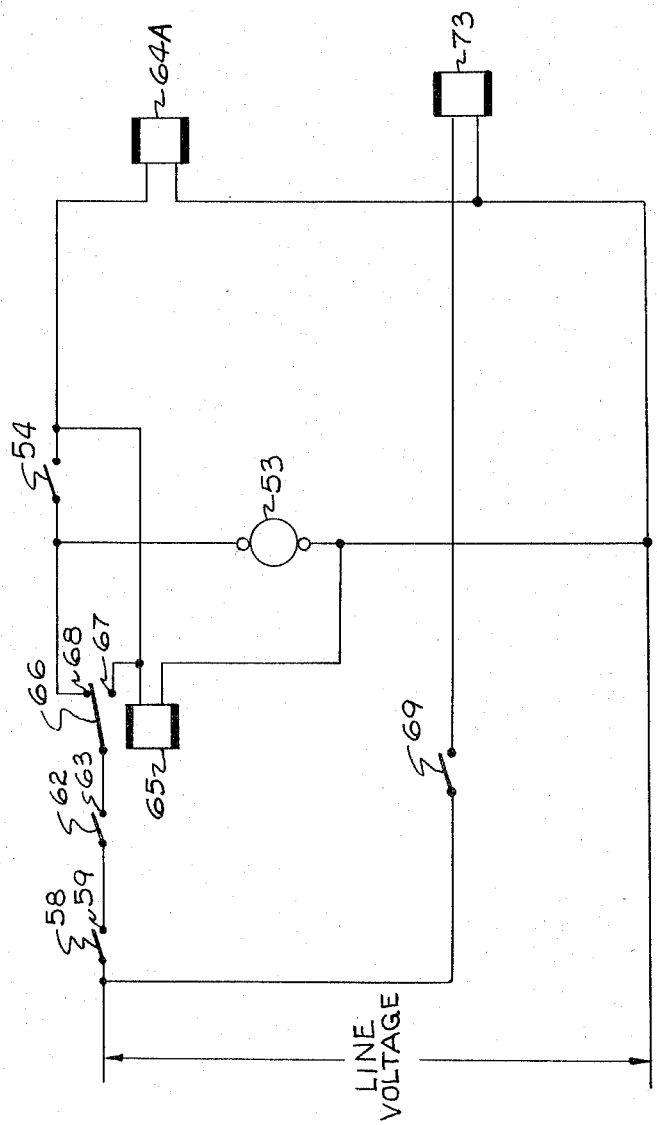
FIG. 10 is a circuit diagram of certain electrical components of the apparatus.

FIG. 10 shows certain electrical components of the circuit including a switch 58 which is normally open and which is closed when the card 51 is in place, thereby making the electrical power available to subsequent circuits from the power supply line. The next switch 62 is closed and supplies current when an unused portion of the periphery of card 51 is detected by the sensing means 60 and opens to cut off the current when an already used portion of the card is sensed. When switch 62 is closed, lamp 53 is energized and the purchaser now closes article-selection switch 54 which is connected to a delivery solenoid 64A which actuates a conveyor 72 to deliver the selected article 34 to conveyor 70. The closing of switch 54 also energizes locking relay 65 which pulls arm 66 from contact with terminal 68 to make contact with terminal 67. This causes a disruption of the power to switch 54 and to lamp 53, thus making the article-selection switch inoperative. Delivery-sensing switch 69 is connected, at one end, to the card punching and coding solenoid 73 and, at the other end, to the power line in advance of power switch 58. The delivery-sensing switch 69 is actuated by merchandise falling from the conveyor, and actuates card punching and coding solenoid 73.

The article-selection switch 54 becomes operative again after a predetermined time when the operation of the punching and coding heads breaks the electrical circuit by opening contacts 62 and 63. As switch 62 reverts to its open position, the flow of power to the locking relay is interrupted. This breaks the "hold" circuit at 67 and the circuit is reset for further operation as the power flows again to article-selection switch 54.

The operation of a particular apparatus of the invention may be initiated by inserting card 51 into opening 50 of an article-selection station and by positioning the card on spindle 55 of turntable 56. The presence of the card is detected by sensor 57. The sensor closes contacts 58 and 59 making electrical power available from this power line to subsequent circuits. When an unpunched portion of the card is contacted with feeler 60, contacts 62 and 63 close. This lights an indicator lamp 53 and power is made available to article-selection switch 54 indicating that the apparatus is ready for operation. This is carried out by closing the article-selection switch 54 which through solenoid 64A activates storage conveyor 72 to release one article onto a conveyor belt 70 which carries it to a shelf 85 in front of article-discharge opening 83. Merchandise falling down the storage conveyor actuates switch 69 which detects delivery and which activates coding solenoid 73 to move card-punching head 74 into contact with card 51.

Article-selection switch 54, when closed also energizes locking relay 65, thereby making the switch ineffective to release another article until the information pertaining to the prior article is recorded on the card. This occurs when the coding head 74 makes contact with the top of the card and the notching element 77 cuts a notch into its periphery adjacent to the price and other information relevant to the article. To deliver another article the card is rotated by means of the knob 52 which controls the turntable until an unused portion of the card's peripheral edge is again in contact with the sensing element.

The portable rotary selector card may be made of any material, which is suitable for printing and punching such as paper or plastic.

The selector card serves as a record for information regarding each article delivered and after it is used, it may be presented to a cashier who can derive all necessary information from it.

The apparatus of the invention permits the elimination of the present checkout and bagging operations; it permits rapid processing of customers and eliminates possible pricing errors.

We claim:
1. Apparatus for dispensing articles, said apparatus including:
   a turntable,
   a card engageable with said turntable for rotation therewith,
   a circuit,
   a first, normally open, switch included in said circuit and adapted, when closed, to connect said circuit to a source of power,
   a first sensing means responsive to the presence of said card on said turntable to close said first switch,
   a second, normally open, switch also included in said circuit,
   a second sensing means responsive to contact with a peripheral portion of said card to close said second switch,
   a third, normally open, switch,
   delivery means operatively connected to said third switch and adapted, when said switch is closed, to deliver an article from a selected storage area,
   a fourth, normally open, switch located in the path of movement of a delivered article and adapted to be closed by such article,
   recording means operatively connected to said fourth switch and adapted, when said switch is closed, to inscribe data relating to the delivered article on a portion of said card, and
   mutilating means operatively connected to said fourth switch to mutilate said peripheral portion of said card to render such portion ineffective to activate said second sensing means, thereby to prevent the closing of said second switch.

2. Apparatus for dispensing articles, said apparatus including:
   a turntable,
   a spindle carried by said turntable,
   a circular card engageable with said spindle for rotation with said turntable,
   a circuit,
   a first, normally open, switch included in said circuit and adapted, when closed, to connect said circuit to a source of power,
   a first sensing means responsive to the presence of said card on said turntable to close said first switch,
   a second, normally open, switch also included in said circuit,
   a second sensing device, movable to a first position in which it closes said second switch and movable to a second position in which it opens said second switch,
   biasing means normally moving said second sensing device to its second position,
   said second sensing device being movable, against the force of said biasing means, by contact with a peripheral portion of the periphery of said card, to its first position,
   a third, normally open, switch,
   delivery means operatively connected to said third switch adapted when, said switch is closed, to deliver an article from a selected storage area,
   a fourth, normally open, switch located in the path of movement of a delivered article and adapted to be closed by such article,
   recording means operatively connected to said fourth switch and adapted, when said switch is closed, to inscribe data relating to the delivered article on a portion of said card, and,
   mutilating means operatively connected to said fourth switch to mutilate said peripheral portion of said card to permit said biasing means to restore said second sensing device to its second position.

3. The apparatus recited in claim 2, and
   a fifth switch also included in the circuit of said third switch, and
   means operable upon the closing of said third switch to open said fifth switch for a predetermined length of time.

4. The apparatus recited in claim 2, and means for rotating said turntable successively to present unmutilated peripheral portions of the card to said second sensing device.

References Cited by the Examiner
UNITED STATES PATENTS

| | | | |
|---|---|---|---|
| 1,682,827 | 9/1928 | Brand | 221—7 X |
| 1,930,265 | 10/1933 | Farmer | 346—96 X |
| 2,496,686 | 2/1950 | Williams | 346—96 X |
| 2,611,673 | 9/1952 | Riise. | |
| 2,824,777 | 2/1958 | Gieringer | 346—83 |
| 2,968,521 | 1/1961 | Gross | 346—85 |
| 3,097,347 | 7/1963 | Simjian | 194—4 |
| 3,204,741 | 9/1965 | Maxwell et al. | 194—4 |

ROBERT B. REEVES, *Primary Examiner.*

KENNETH N. LEIMER, *Examiner.*